United States Patent [19]

Sauer, deceased et al.

[11] Patent Number: 4,549,355
[45] Date of Patent: Oct. 29, 1985

[54] ELECTRONIC DENDROMETER

[75] Inventors: Ronald H. Sauer, deceased, late of Richland, Wash., by Joan K. Sauer, legal representative; Peter A. Beedlow, Kennewick, Wash.

[73] Assignee: Battelle Memorial Institute, Richland, Wash.

[21] Appl. No.: 568,251

[22] Filed: Jan. 4, 1984

[51] Int. Cl.[4] .............................................. G01B 5/00
[52] U.S. Cl. .................................. 33/148 H; 33/149 J; 33/DIG. 13
[58] Field of Search ............ 33/143 L, 147 D, 148 D, 33/148 H, 149 J, DIG. 19, DIG. 13, 178 R, 178 E, 174 L, 175; 47/1 R

[56] References Cited

U.S. PATENT DOCUMENTS

| | | |
|---|---|---|
| Re. 31,023 | 9/1982 | Hall, III . |
| 466,986 | 1/1892 | Van Roden .................. 33/148 E |
| 1,305,701 | 6/1919 | Douglass ..................... 33/148 F |
| 2,236,443 | 3/1941 | Oboler . |
| 2,423,867 | 7/1947 | Zener et al. ................. 33/148 D |
| 2,611,970 | 9/1952 | Johnson . |
| 2,666,262 | 1/1954 | Ruge ........................... 33/148 D |
| 2,799,945 | 7/1957 | Tiller . |
| 2,815,424 | 12/1957 | Painter . |
| 2,924,019 | 2/1960 | Verner . |
| 3,060,637 | 10/1962 | Fumeaux . |
| 3,169,323 | 2/1965 | Hold . |
| 3,303,572 | 2/1967 | Vreeland ...................... 33/178 E |
| 4,015,366 | 4/1977 | Hall, III . |
| 4,251,918 | 2/1981 | Duggan . |
| 4,290,311 | 9/1981 | Brewer . |
| 4,294,015 | 10/1981 | Drouin et al. . |

FOREIGN PATENT DOCUMENTS

| | | | |
|---|---|---|---|
| 1017373 | 10/1957 | Fed. Rep. of Germany ... | 33/148 H |
| 1109238 | 10/1968 | United Kingdom ............... | 33/149 J |

*Primary Examiner*—Harry N. Haroian
*Attorney, Agent, or Firm*—Wells, St. John & Roberts

[57] ABSTRACT

Disclosed is a dendrometer for use on soft stemmed herbaceous plants. The dendrometer uses elongated jaws to engage the plant stem securely but without appreciable distortion or collapse of the stem. A transducer made of flexible, noncorrodible and temperature stable material spans between the jaws which engage the plant stem. Strain gauges are attached at appropriate locations on a transducer member and are connected to a voltage source and voltmeter to monitor changes in plant stem size. A microprocessor can be used to integrate the plant stem size information with other relevant environmental parameters and the data can be recorded on magnetic tape or used in other data processing equipment.

27 Claims, 6 Drawing Figures

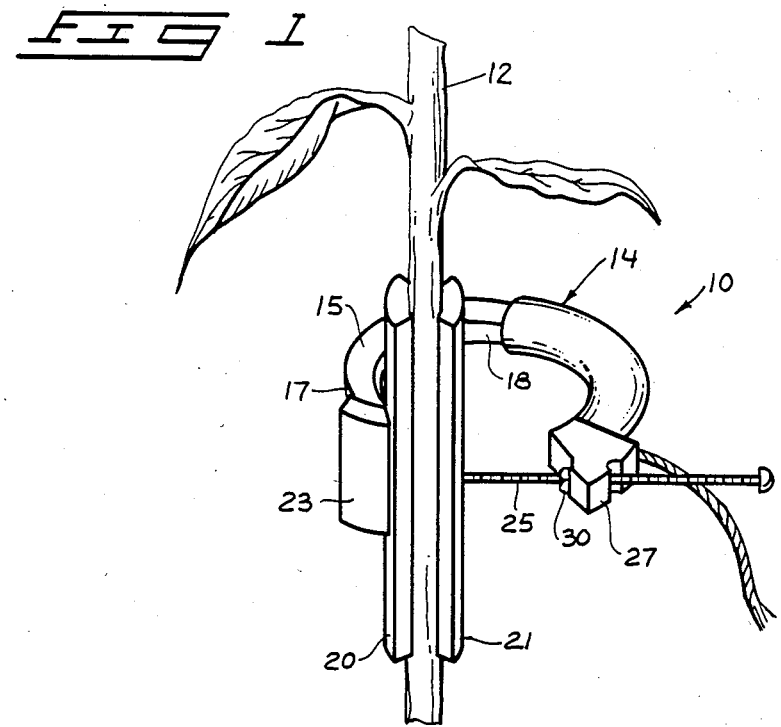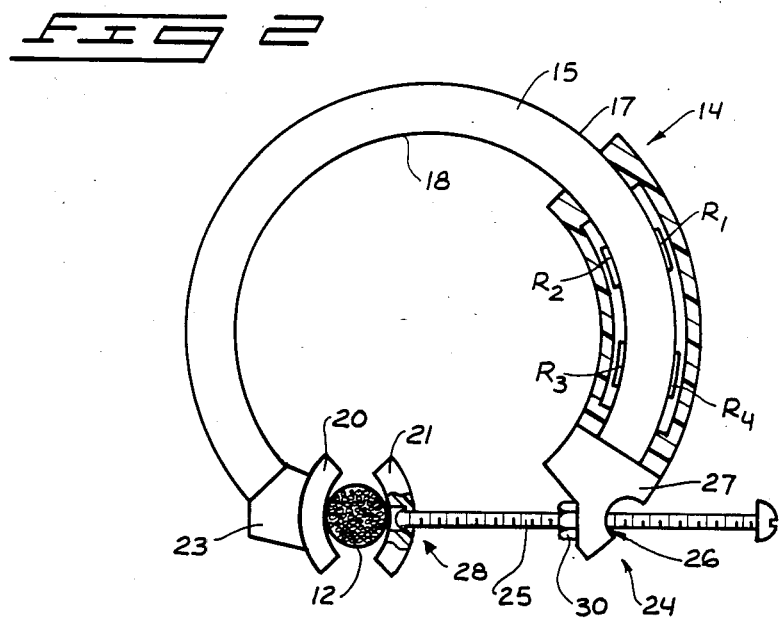

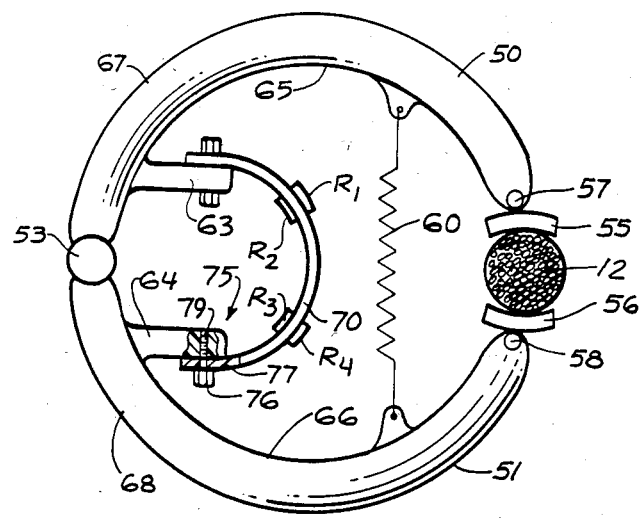
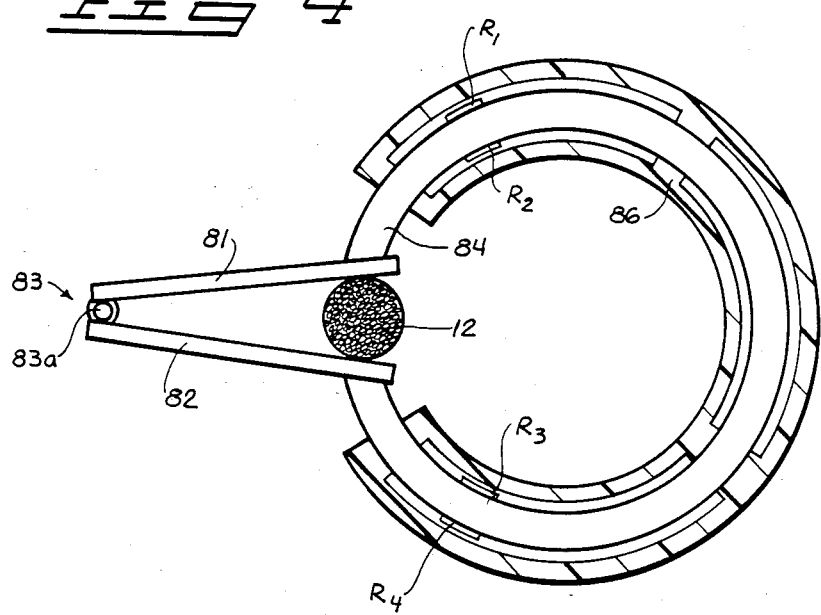

ELECTRONIC DENDROMETER

TECHNICAL FIELD

The technical field of this invention is dendrometers for herbaceous plants.

BACKGROUND OF THE INVENTION

There are many instances in the field of plant husbandry when it is desirable to determine with accuracy the stem size of a plant. There are also other instances when it is desirable to monitor the size of the plant stem over a period of time. Previously, it has been known that calipers or micrometers or similar types of measuring devices could be used to measure the stem size of plants. Unfortunately these measuring devices often cause the stems of soft tissue herbaceous plants to collapse, thereby rendering the measurement of the stem size a tricky process requiring extra care by the researcher. These traditional types of measuring devices are also not suitable for accurately monitoring the size of the plant stem over time.

Recent discoveries indicate that plants undergo changes in stem size as a result of various environmental factors including adequacy of the water supply, exposure to sunlight, and types and amounts of fertilizer. Many other variables are also potential factors affecting the stem size of plants. Environmental pollution may also be significant in affecting the stem size of plants, thereby providing an environmental monitoring system using particular types of sensitive plants and a stem monitoring dendrometer.

The prior art has heretofore not included a very accurate and repeatable dendrometer which is capable of measuring and continously monitoring the diametrical size of herbaceous plants. The current invention is directed to this problem with specific importance played on the ability to continuously monitor the stem size using microprocessor technology and memory for storing the stem size data.

BRIEF DESCRIPTION OF THE DRAWINGS

A preferred and alternate embodiment of this invention is illustrated in the accompanying drawings, in which:

FIG. 1 is a perspective view showing an electronic dendrometer according to this invention as it is installed upon the stem of a herbaceous plant;

FIG. 2 is a top view of the dendrometer shown in FIG. 1;

FIG. 3 is a plan view of an alternative embodiment of the invention;

FIG. 4 is a top view showing a second alternative form of dendrometer;

DETAILED DESCRIPTION OF THE PREFERRED EMBODIMENTS

Figure 5:
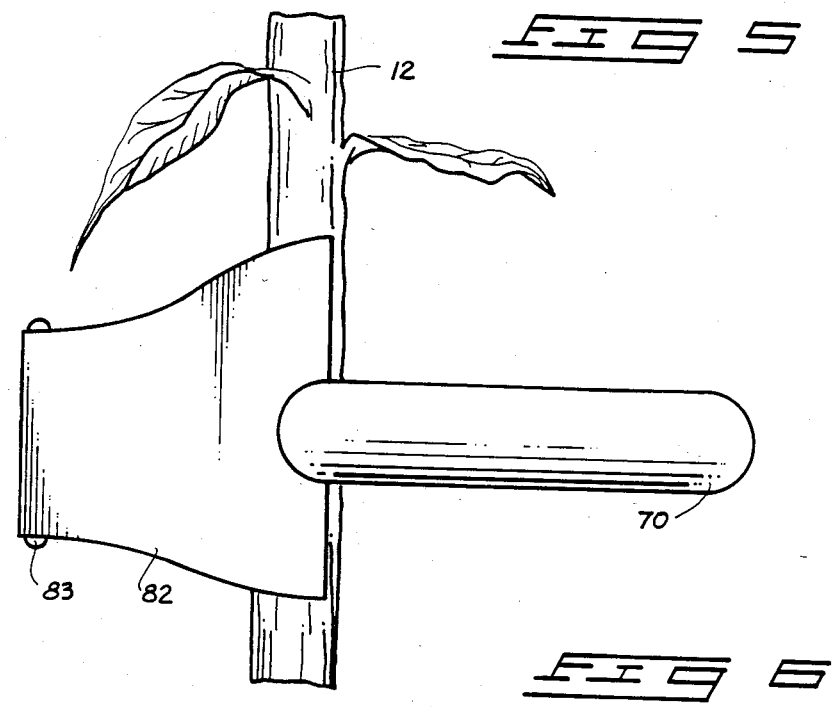
FIG. 5 is a side elevational view of the alternative dendrometer shown in FIG. 4.

In compliance with the constitutional purpose of the Patent Laws "to promote the progress of science and useful arts" (Article 1, Section 8), applicant submits the following disclosure of the invention.

FIG. 1 shows a dendrometer 10 according to the invention. Dendrometer 10 is installed upon a plant stem 12 which is being monitored for changes in diametrical stem size. Dendrometer 10 includes a transducer 14 which converts stem size changes into fluctuations in voltage. Transducer 14 includes a transducer member 15 which is preferably a C-shaped structure made with relatively temperature stable noncorrodible plastic or other material. Transducer 14 also comprises a plurality of strain gauges $R_1$ through $R_4$ which are affixed to transducer member 15 (See FIG. 2). Strain gauges $R_1$ and $R_4$ are preferably attached to the outside edge 17 of transducer member 15. Strain gauges $R_2$ and $R_3$ are attached along the inside edge 18 of transducer member 15. This arrangement places strain gauges $R_1$ and $R_4$ under relative compression when stem size 12 increases and under relative tension when the size of stem 12 decreases. Conversely, strain gauges $R_2$ and $R_3$ are placed under relative tension when stem 12 increases in size and under relative compression when the stem decreases in size. These changes in the relative amounts of tension or compression experienced by the strain gauges causes changes in their resistance which can be interpreted to give an electronic indication of the diametrical size of stem 12 in a manner which will be described more fully below.

Dendrometer 10 also includes elongated jaws 20 and 21 for engaging the sides of stem 12. Jaws 20 and 21 are shaped in a longitudinally elongated form to reduce the compressive stress applied to the plant stem when the jaws are clamped onto the stem. Jaws 20 and 21 are also preferably concavely shaped on the interior surfaces to approximate the external shape of the stem.

Jaws 20 and 21 are connected to transducer member 15 in a manner which allows adjustment of the spacing between the jaws. FIG. 2 shows a jaw connection block 23 which is rigidly affixed to the end of transducer member 15. Jaw connection block 23 is also rigidly attached to jaw 20.

Jaw 21 is connected to the opposite end of transducer member 15 using an adjustable jaw connection means 24. Adjustable jaw connection means 24 includes an adjustment bolt 25 which extends through an aperture 26 in bolt block 27. Bolt block 27 is rigidly attached to transducer member 15. The position of bolt 25 with respect to bolt block 27 is determined by nut 30 which is threaded onto the bolt and is adjustably positioned thereon to determine jaw spacing. Adjustment bolt 25 is preferably connected to jaw 21 with a rotatable jaw connector 28 which allows jaw 21 to remain aligned with stem 12 even though bolt 25 may be inadvertently turned.

FIG. 3 shows an alternative embodiment of the invention having two arms 50 and 51 which are connected by a pivot or a hinge 53. Pivot 53 allows arms 50 and 51 to rotate with respect to each other to accommodate a range of stem sizes.

The dendrometer of FIG. 3 also includes jaws 55 and 56 which are pivotally connected to arms 50 and 51 at jaw pivots 57 and 58, respectively. A biasing means such as spring 60 extends between arms 50 and 51 to bias jaws 55 and 56 together.

Arms 50 and 51 also have transducer connection flanges 63 and 64 which can extend either inwardly from inner surfaces 65, 66 or outwardly from outer surfaces 67 and 68 of arms 50 and 51, respectively. A transducer member 70 is curved between the transducer connection flanges 63 and 64. As jaws 55 and 56 separate or become closer then transducer member 70 is subjected to deformation because of the fluctuating relative position between the transducer flanges 63 and 64. Deformation of the transducer member 70 produces strain in the transducer member which is sensed by strain gauges $R_1$ through $R_4$ mounted along the outer and inner surfaces of transducer member 70 in a fashion similar to that shown in FIG. 2 and described above.

Transducer member 70 is preferably securely attached at one end to transducer flange 63. At the opposite end transducer member 70 is adjustably connected to transducer flange 64 using a transducer adjustment means 75 which allows the degree of flex of transducer member 70 to be adjusted. The transducer adjustment means 75 can advantageously be a bolt 76 which is rotatably positioned through an aperture 77 in transducer member 70. Bolt 76 has a threaded exterior which is received in a threaded opening 79 in transducer bracket 64. Rotating bolt 76 allows the amount of strain in transducer member 70 to be adjusted to easily zero the dendrometer during setup.

FIGS. 4 and 5 show a third embodiment of the invention clamped about plant stem 12. The dendrometer of FIGS. 4 and 5 includes two contact plates 81 and 82. Contact plates 81 and 82 are connected together at pivot 83 with pivot pin 83a. A transducer member 84 is preferably C-shaped and spans from the outside of contact plate 81 to the outside of contact plate 82. The C-shaped transducer member can be either rigidly or pivotally connected to contact plates 81 and 82. Transducer member 84 has inherent resiliency which is properly sized and shaped to bias contact plates 81 and 82 against the sides of stem 12. The dendrometer of FIGS. 4 and 5 is installed by removing pivot pin 83a, thereby allowing the contact plates to be separated and installed onto the plant stem to assume the position shown in FIG. 4.

The transducer member 84 is preferably covered with a protective sleeve 86 which encapsulates the member and also the attached strain gauges $R_1$ through $R_4$.

Figure 6:
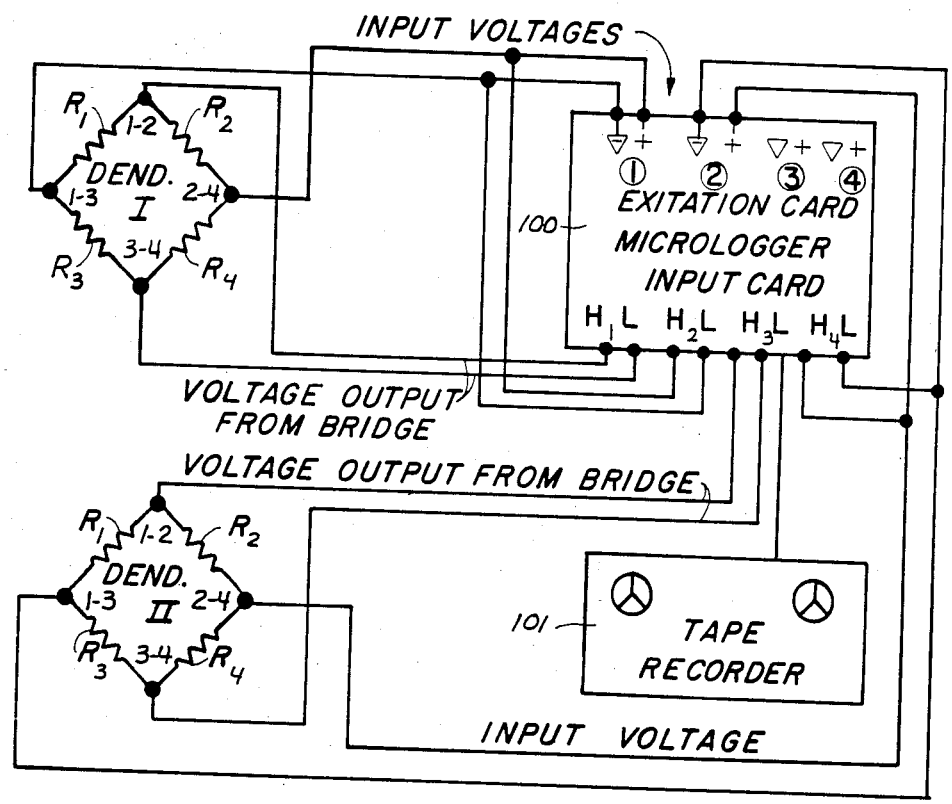
FIG. 6 is a circuit diagram showing how strain gauges of the dendrometer are connected to a system for recording of stem size data.

FIG. 6 shows that strain gauges $R_1$ through $R_4$ of two dendrometers connected together in a wheatstone bridge arrangement with an input voltage being provided to the bridge at nodes 1-3 and 2-4 from the excitation card of micrologger 100. The bridge output is a voltage difference which exists between nodes 1-2 and 3-4. This potential difference can be read directly on a voltmeter or can be hooked to microprocessor and used for a variety of data processing uses.

The wheatstone bridge arrangement for strain gauges $R_1$ through $R_4$ must be consistent with the positioning of the strain gauges on the transducer members. FIG. 2 shows strain gauges $R_1$ and $R_4$ on the exterior or outside surface 17. When the size of stem 12 increases these strain gauges are subjected to relative compression which reduces the resistances of strain gauges $R_1$ and $R_4$. Conversely, the resistance of strain gauges $R_2$ and $R_3$ increase. Referring to FIG. 6 we see that when resistance $R_1$ and $R_4$ increase, then the voltage at node 1-2 with respect to node 3-4 becomes relatively greater. This change in the potential difference is measured by a voltmeter and translated into a displacement measurement either mentally or using or a microprocessor or micrologger 100 which sends signals to a tape recorder 101 to automatically record the stem size data.

The change in voltage between nodes 1-2 and 3-4 is preferably calibrated to provide an accurate measurement of the increase in stem size 12. The electronic dendrometers are normally calibrated for both displacement and changes in temperature. To calibrate the dendrometer for displacement a micrometer is used to measure the displacement change occurring between the jaws. The voltage change is recorded while this displacement occurs. The changes in displacement and voltage are recorded over the useful range of the dendrometer and a relationship between linear displacement such as in millimeters is plotted versus the output voltage in millivolts. Repeated measurements are made and the displacement versus voltage relationship is established for future use with the dendrometer.

Temperature calibration of the invention can be performed by attaching a thermocouple such as copper constantan thermocouple to the protective sleeve surrounding the transducer member. The thermocouple is used to constantly record the ambient temperature. A reference block made of a material such as the nickel alloy called invar having a coefficient of expansion of $0.9 \times 10-8$ cm/cm/°C. is placed between the jaws of the dendrometer and the jaws are tightened upon it. The dendrometer is then exposed to a range of ambient temperatures ranging from approximately zero to 40° C. The relationship between temperature and output voltage is recorded and a correction factor over varying temperatures is derived for use in interpreting voltage readings which are recorded over periods of time during which the ambient temperature change.

The transducer members are preferably made from a relatively noncorrodible, temperature stable material such as polyvinyl chloride or other polymer materials. The elongated jaws are also preferably made from such materials to reduce the effects of changes in ambient temperature on the accuracy of the dendrometer.

The dendrometers of this invention are used by placing them upon the stem of a plant at a position close to the ground. The dendrometers can be supported by a stand (not shown) or when necessary by the plant stem. The dendrometer must be able to securely engage the plant stem to prevent slippage or movement. The jaws are firmly clamped to the stem using the adjustment bolt 25 and nut 30. Wires from the strain gauges are then attached to the microprocessor or micrologger 100. The output voltage from the wheatstone bridge arrangement of strain gauges is then adjusted by tightening the adjustable jaw connection means 24 so that the voltage lies in a suitable range such as the zero to 20 millivolt range.

During operation, the diametrical stem size is constantly monitored and correlated to other relevant environmental data such as soil moisture, temperature, air quality and humidity. All data is stored on magnetic tape or transferred directly to a computer for processing.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. An electronic dendrometer for measuring the diametrical size of herbaceous plant stems, comprising:
a transducer member;

elongated jaws connected to opposite ends of the transducer member for contacting opposite sides of a plant stem;

two arms pivotably connected together with the transducer member spanning between the two arms; the two arms serving to connect the elongated jaws to opposite ends of the transducer member; and strain gauge means connected to the transducer member for detecting changes in the strain existing in the transducer member, from which changes in the size of the plant stem can be determined.

2. The electronic dendrometer of claim 1 further comprising a transducer adjustment means adjustably connecting the transducer member to one of the two arms.

3. The electronic dendrometer of claim 5 further comprising biasing means for biasing the jaws together.

4. The electronic dendrometer of claim 6 wherein the jaws are pivotally attached to the arms.

5. The electronic dendrometer of claim 1 further comprising biasing means for biasing the jaws together.

6. The electronic dendrometer of claim 1 wherein the jaws are pivotally attached to the arms.

7. The electronic dendrometer of claim 1 wherein the arms are curved.

8. The electronic dendrometer of claim 7 wherein the arms are circularly curved from a pivot joining the arms together, to a point where the jaws are connected thereto.

9. The electronic dendrometer of claim 1 wherein the arms further comprise flanges extended therefrom to which the transducer member is attached.

10. The electronic dendrometer of claim 9 further comprising transducer adjustment means adjustably connecting the transducer member to at least one of the two arms.

11. The electronic dendrometer of claim 10 further comprising biasing means for biasing the jaws together.

12. The electronic dendrometer of claim 11 wherein the jaws are pivotally attached to the arms.

13. The electronic dendrometer of claim 1 wherein the jaws and arms are integrated into two contact plates pivotally connected together.

14. The electronic dendrometer of claim 1 wherein the arms are contact plates pivotally connected together with the transducer member being connected to outer surfaces thereof and spanning outwardly so that the contact plates act as said jaws.

15. The electronic dendrometer of claim 1 wherein the jaws are provided with concave contacting faces.

16. An electronic dendrometer for measuring the diametrical size of herbaceous plant stems, comprising:

a transducer member;

elongated jaws connected to opposite ends of the transducer member for contacting opposite sides of a plant stem; the jaws being two contact plates pivotally connected together;

strain gauge means connected to the transducer member for detecting changes in the strain existing in the transducer member, from which changes in the size of the plant stem can be determined.

17. The electronic dendrometer of claim 16 wherein the transducer member is connected to outer surfaces of the contact plates extending outwardly therefrom to span between the contact plates.

18. The electronic dendrometer of claim 17 wherein the transducer member curves between the contact plates.

19. The electronic dendrometer of claim 16 wherein the transducer member is constructed from flexible material allowing the transducer member to act as a biasing means to bias the contact plates together.

20. An electronic dendrometer for measuring the diametrical size of herbaceous plant stems, comprising:

a transducer member formed from a piece of continuous, flexible material and having two ends; said transducer member being formed such that the two ends are positioned in opposing relationship;

jaw means connected to the ends of said transducer member; said jaw means being longitudinally elongated and having elongated opposed contacting faces for engaging a plant stem over a substantial longitudinal length thereof; and strain gauge means connected to the transducer member for detecting changes in the strain existing in the transducer member, from which changes in the size of the plant stem can be determined.

21. The electronic dendrometer of claim 20 wherein the transducer member is continuously curved between the two ends thereby providing biasing means to bias the contacting faces of the jaw means together.

22. The electronic dendrometer of claim 20 wherein the transducer member is C-shaped.

23. The electronic dendrometer of claim 20 further comprising blocks rigidly connected at ends of the transducer member for connecting the jaw means thereto.

24. The electronic dendrometer of claim 20 further comprising adjustable jaw connection means for adjustably spacing the opposed contacting faces.

25. The electronic dendrometer of claim 24 wherein the adjustable jaw connection means includes an adjustment bolt connected to one end of the transducer member and having one jaw pivotally connected thereto.

26. The electronic dendrometer of claim 20 wherein said jaw means have concave contacting faces.

27. The electronic dendrometer of claim 20 wherein said jaw means are pivotally connected to said transducer member.

* * * * *